US010310472B2

(12) United States Patent
Matergia et al.

(10) Patent No.: US 10,310,472 B2
(45) Date of Patent: Jun. 4, 2019

(54) SYSTEM FOR MONITORING AND CONTROLLING AN INDUSTRIAL PLANT

(71) Applicant: Comau S.p.A., Grugliasco (Turin) (IT)

(72) Inventors: Francesco Matergia, Grugliasco (IT); Guido Rumiano, Grugliasco (IT); Pietro Alberto Cultrona, Grugliasco (IT)

(73) Assignee: Comau S.p.A., Grugliasco (Turin) (IT)

( * ) Notice: Subject to any disclaimer, the term of this patent is extended or adjusted under 35 U.S.C. 154(b) by 64 days.

(21) Appl. No.: 15/520,197

(22) PCT Filed: Oct. 23, 2015

(86) PCT No.: PCT/IB2015/058064
§ 371 (c)(1),
(2) Date: Apr. 19, 2017

(87) PCT Pub. No.: WO2016/063212
PCT Pub. Date: Apr. 28, 2016

(65) Prior Publication Data
US 2017/0308050 A1    Oct. 26, 2017

(30) Foreign Application Priority Data

Oct. 23, 2014 (EP) .................................. 14190041

(51) Int. Cl.
*G05B 19/04* (2006.01)
*G05B 19/042* (2006.01)
*G05B 19/05* (2006.01)

(52) U.S. Cl.
CPC ....... *G05B 19/0426* (2013.01); *G05B 19/056* (2013.01); *G05B 2219/13004* (2013.01); *G05B 2219/23406* (2013.01)

(58) Field of Classification Search
CPC ......................... G05B 19/0426; G05B 19/056
See application file for complete search history.

(56) References Cited

U.S. PATENT DOCUMENTS 3,882,305 A    5/1975  Johnstone
4,653,109 A    3/1987  Lemelson et al.
(Continued)

FOREIGN PATENT DOCUMENTS

CN            1926488 A         3/2007
DE     102007039425 A1         2/2009
(Continued)

*Primary Examiner* — Vincent H Tran
(74) *Attorney, Agent, or Firm* — Young Basile Hanlon & MacFarlane, P.C.

(57) ABSTRACT

A system and method for monitoring and controlling an industrial plant having a plurality of assembly/processing stations (ST) divided into separate control areas (A), each control area having an electronic control and processing unit (PLC). A portable computer (TAB) selectively serves as the industrial plant global monitoring device and the human machine interface (HMI) for the processing stations through one or more applications or programs.

The portable computer is selectively placed in communication with selective of the electronic control and processing units for selected global monitoring of the industrial plant operations, local monitoring of at least one of the assembly/ processing stations and/or control of at the assembly/processing stations through sending of signals to the electronic control and processing unit(s).

In one example, identification devices (DK) or network access points (AP) are used in each control area to detect the presence of the portable computer in or near a given control area to establish communication between the portable computer and the electronic control and processing unit(s).

16 Claims, 7 Drawing Sheets

(56) References Cited

U.S. PATENT DOCUMENTS

| | | |
|---|---|---|
| 4,831,531 A | 5/1989 | Adams et al. |
| 4,851,985 A | 7/1989 | Burror et al. |
| 4,888,692 A | 12/1989 | Gupta et al. |
| 5,097,470 A | 3/1992 | Gihl |
| 5,148,363 A | 9/1992 | Sakamoto et al. |
| 5,329,469 A | 7/1994 | Watanabe |
| 5,711,697 A | 1/1998 | Taninaga et al. |
| 5,721,686 A | 2/1998 | Shahraray et al. |
| 5,757,648 A | 5/1998 | Nakamura |
| 5,767,648 A | 6/1998 | Morel et al. |
| 5,796,868 A | 8/1998 | Dutta-Choudhury |
| 5,822,212 A | 10/1998 | Tanaka et al. |
| 5,870,693 A | 2/1999 | Seng et al. |
| 5,929,584 A | 7/1999 | Gunnarsson et al. |
| 5,949,676 A | 9/1999 | Elsley |
| 6,023,667 A | 2/2000 | Johnson |
| 6,114,824 A | 9/2000 | Watanabe |
| 6,138,056 A | 10/2000 | Hardesty et al. |
| 6,166,811 A | 12/2000 | Long et al. |
| 6,185,466 B1 | 2/2001 | Nicewonger |
| 6,236,896 B1 | 5/2001 | Watanabe et al. |
| 6,272,244 B1 | 8/2001 | Takahashi et al. |
| 6,321,137 B1 | 11/2001 | De Smet |
| 6,330,493 B1 | 12/2001 | Takahashi et al. |
| 6,349,249 B1 | 2/2002 | Cunningham |
| 6,401,011 B1 | 6/2002 | Hashimukai |
| 6,408,252 B1 | 6/2002 | De Smet |
| 6,434,449 B1 | 8/2002 | De Smet |
| 6,507,765 B1 | 1/2003 | Hopkins et al. |
| 6,556,891 B2 | 4/2003 | Hietmann et al. |
| 6,587,750 B2 | 7/2003 | Gerbi et al. |
| 6,665,581 B2 | 12/2003 | Nishida et al. |
| 6,782,294 B2 | 8/2004 | Reich et al. |
| 6,804,580 B1 | 10/2004 | Stoddard et al. |
| 6,807,461 B2 | 10/2004 | Kneifel, II et al. |
| 7,027,893 B2 | 4/2006 | Perry et al. |
| 7,039,484 B2 | 5/2006 | Dafemer |
| 7,076,094 B2 | 7/2006 | Chi et al. |
| 7,079,984 B2 | 7/2006 | Eryurek et al. |
| 7,120,832 B2 | 10/2006 | Collins et al. |
| 7,126,732 B2 | 10/2006 | McNeal et al. |
| 7,149,606 B2 | 12/2006 | Krause |
| 7,200,260 B1 | 4/2007 | Watanabe et al. |
| 7,206,449 B2 | 4/2007 | Raskar et al. |
| 7,209,859 B2 | 4/2007 | Zeif |
| 7,233,405 B2 | 6/2007 | Fromherz |
| 7,246,014 B2 | 7/2007 | Forth et al. |
| 7,305,114 B2 | 12/2007 | Wolff et al. |
| 7,321,808 B2 | 1/2008 | Nagamatsu |
| 7,330,777 B2 | 2/2008 | Hashimoto et al. |
| 7,343,222 B2 | 3/2008 | Solomon |
| 7,379,782 B1 | 5/2008 | Cocco |
| 7,409,303 B2 | 8/2008 | Yeo et al. |
| 7,412,861 B2 | 8/2008 | Lohmann |
| 7,502,707 B2 | 3/2009 | Da Silva Neto |
| 7,512,946 B2 | 3/2009 | MacLellan |
| 7,570,795 B2 | 8/2009 | Yu et al. |
| 7,591,078 B2 | 9/2009 | Crampton |
| 7,620,478 B2 | 11/2009 | Fortell et al. |
| 7,623,736 B2 | 11/2009 | Viswanathan |
| 7,676,390 B2 | 3/2010 | Senturk et al. |
| 7,680,748 B2 | 3/2010 | Heisele et al. |
| 7,689,320 B2 | 3/2010 | Prisco et al. |
| 7,739,099 B2 | 6/2010 | Liu et al. |
| 7,751,325 B2 | 7/2010 | Krishnamurthy et al. |
| 7,779,716 B2 | 8/2010 | Dellach et al. |
| 7,819,859 B2 | 10/2010 | Prisco et al. |
| 7,904,205 B2 | 3/2011 | Kobayashi et al. |
| 7,971,181 B2 | 6/2011 | Pabalate et al. |
| 8,073,564 B2 | 12/2011 | Bruemmer et al. |
| 8,098,928 B2 | 1/2012 | Ban et al. |
| 8,335,575 B2 | 12/2012 | Papenfort et al. |
| 8,428,990 B2 | 4/2013 | Moll et al. |
| 8,612,051 B2 | 12/2013 | Norman et al. |
| 8,843,221 B2 | 9/2014 | Wang et al. |
| 8,849,687 B2 | 9/2014 | Hakim et al. |
| 9,802,286 B2 * | 10/2017 | Nishi .................. B23Q 17/00 |
| 2002/0111702 A1 | 8/2002 | Angel |
| 2003/0198376 A1 | 10/2003 | Sadighi et al. |
| 2004/0013295 A1 | 1/2004 | Sabe et al. |
| 2004/0133382 A1 | 7/2004 | Ban et al. |
| 2004/0148058 A1 * | 7/2004 | Johannessen ............ B25J 13/06 700/245 |
| 2004/0225648 A1 | 11/2004 | Ransom et al. |
| 2005/0004707 A1 * | 1/2005 | Kazi ..................... B25J 9/1682 700/245 |
| 2005/0015180 A1 * | 1/2005 | Steger ............. G05B 19/41855 700/230 |
| 2005/0027504 A1 | 2/2005 | Watanabe |
| 2005/0119863 A1 | 6/2005 | Buikema et al. |
| 2005/0197803 A1 | 9/2005 | Eryurek et al. |
| 2005/0240592 A1 | 10/2005 | Mamou et al. |
| 2006/0101465 A1 | 5/2006 | Kato et al. |
| 2006/0107508 A1 | 5/2006 | Bonse et al. |
| 2006/0276934 A1 * | 12/2006 | Nihei .................... B25J 9/1656 700/245 |
| 2007/0297890 A1 * | 12/2007 | Sjoberg ................. B25J 13/065 414/735 |
| 2009/0088897 A1 | 4/2009 | Zhao et al. |
| 2009/0190826 A1 | 7/2009 | Tate et al. |
| 2009/0210081 A1 | 8/2009 | Sustaeta et al. |
| 2009/0248038 A1 | 10/2009 | Blumenkranz et al. |
| 2011/0320028 A1 * | 12/2011 | Penick ............... G05B 19/4185 700/112 |

FOREIGN PATENT DOCUMENTS

| | | |
|---|---|---|
| EP | 1043642 A3 | 8/2005 |
| GB | 949150 A | 2/1964 |
| GB | 2143800 A | 2/1985 |
| GB | 2452635 A | 3/2009 |
| JP | H1177575 A | 3/1999 |
| JP | 2002315963 A | 10/2002 |
| JP | 2003127085 A | 5/2003 |
| JP | 2004017260 A | 1/2004 |
| KR | 20060015557 A | 2/2006 |
| WO | 2005001699 A3 | 2/2005 |

* cited by examiner

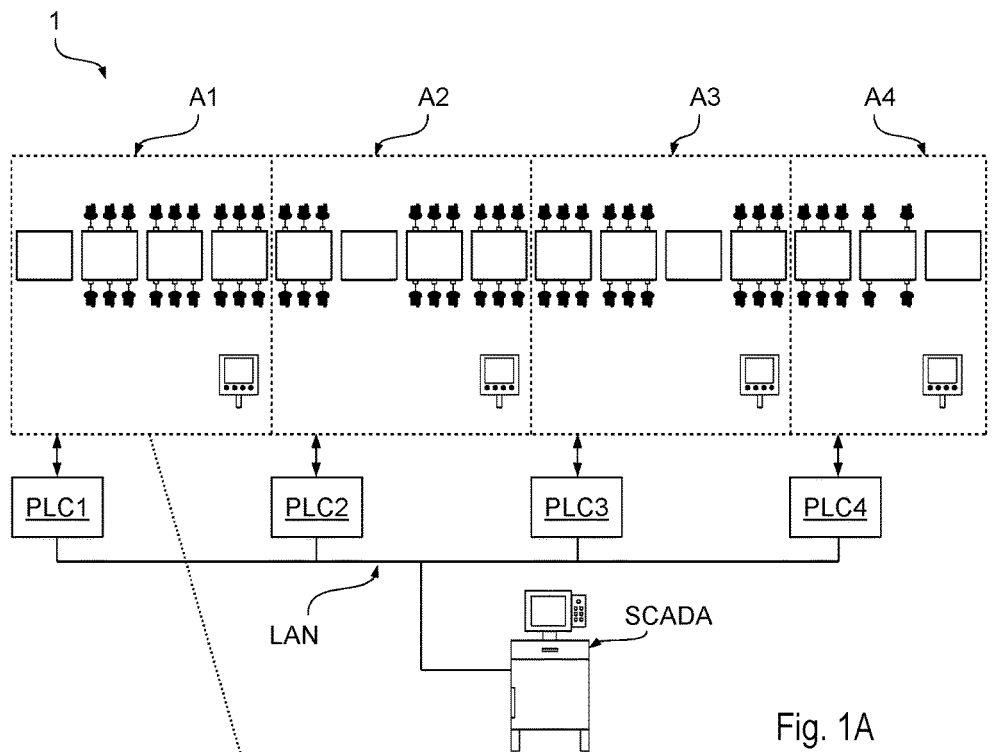
Fig. 1A
PRIOR ART
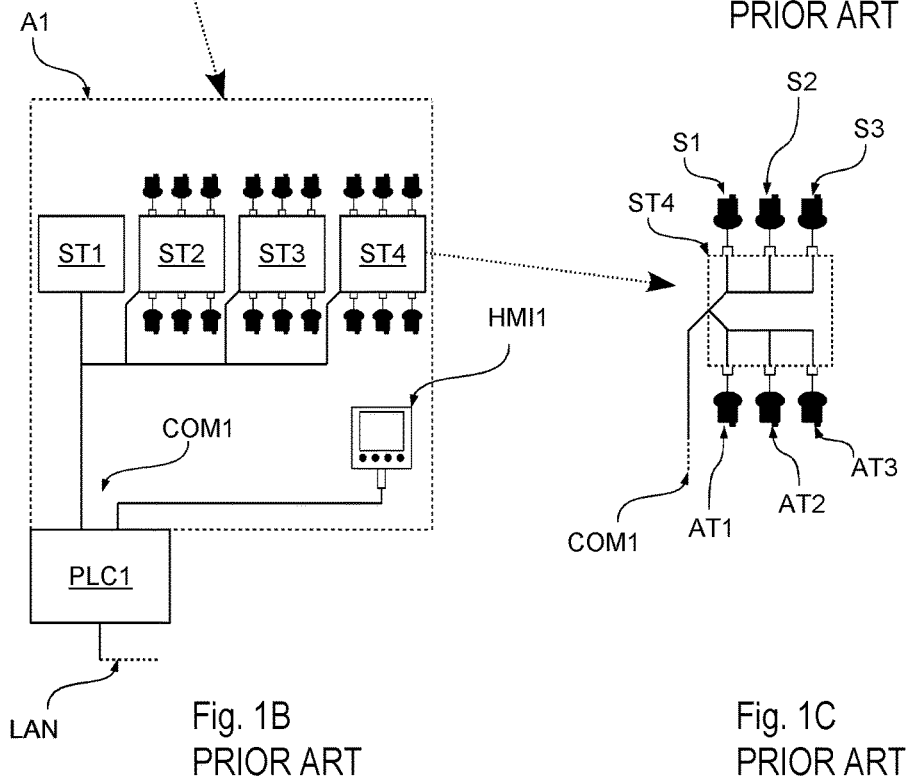
Fig. 1B
PRIOR ART
Fig. 1C
PRIOR ART

SYSTEM FOR MONITORING AND CONTROLLING AN INDUSTRIAL PLANT

TECHNICAL FIELD

The present invention relates to systems for monitoring and controlling an industrial plant, for example for assembly and/or manufacture of structures and/or components of motor vehicles.

The invention also regards systems that use the information on production and status of the plant, generated and made available by such industrial production processes, for example for monitoring, solving, and managing the errors and/or malfunctioning of certain parts of the plant.

In greater detail, the present invention relates to monitoring and control systems that comprise human-machine interfaces, which enable an operator to display the aforesaid information on production and status of the plant and to generate and send commands for management and control of the plant itself or portions thereof.

BACKGROUND

A scheme of an industrial plant 1 or assembly line, for example for structures or components of motor vehicles, of a known type is represented in FIGS. 1A, 1B, and 1C.

In general, the plant 1 comprises a plurality of processing and/or assembly stations ST, for example cascaded to one another, where each station ST performs a given operation, such as, for example, a machining operation on a piece that it receives at input and/or an assembly of pieces received. For instance, the plant illustrated in FIG. 1A envisages fifteen stations ST, and at the end of the process the last station ST yields the semifinished piece.

In the example considered, the entire plant 1 is divided into control areas A, such as four areas A1, A2, A3 and A4.

As illustrated for example in FIG. 1B, each area A comprises a subset of stations ST controlled by one and the same fixed human-machine-interface (HMI) unit. For instance, the first area A1 may comprise the first four stations ST1, ST2, ST3 and ST4. These stations are monitored and controlled by the first fixed human-machine-interface unit designated by the reference HMI1.

Likewise, the area A2 may comprise the next four stations controlled by the second fixed human-machine-interface unit. In general, the number of stations ST may even be different for the various control areas A.

Consequently, the first station ST1 can receive a piece to be assembled and carry out its pre-set intervention on the original piece for producing a semifinished piece to be supplied at output. The semifinished product at output from the station ST1 is supplied at input to a second station ST2, where it is received and clamped in position for the subsequent process envisaged in the station ST2, etc.

Each station ST is typically equipped with at least one actuator means and/or one sensor means for carrying out and/or monitoring the operations performed in that station. For instance, the operations that are carried out in each station may be: assembly of some additional parts, welding, control of the quality of the welds, etc. There may also be envisaged stations that perform exclusively a function of storage and/or conveyance, such as, for example, the stations ST1, ST6, ST11 and ST15, which may for example be magazines or conveyor belts.

Usually, present in the aforesaid stations ST are one or more industrial robots to render the operation faster and of high quality. An industrial robot is an automatically controlled, re-programmable, multi-purpose manipulator, frequently used in applications of industrial automation for carrying out manufacturing processes. Hence, typically, the actuator means and sensor means are on board said industrial robot and enable execution and monitoring of the various processing steps.

The piece remains in each station ST for the time necessary for carrying out the process or operation established for that given station. At the end of the operation in one station, the piece is released and can proceed along the path towards the next station of the assembly line. For this purpose (see, for example, FIG. 1C), typically each assembly station ST, for example the stations ST2-ST5, ST7-ST10 and ST12-ST14, is equipped with actuator means AT1, AT2, AT3, . . . , for carrying out the process or processes associated to the station and/or with sensor means S1, S2, S3, . . . , for acquisition of parameters on the status of the station.

As mentioned previously, each control area A is typically equipped with a fixed human-machine-interface unit HMI. For instance, the plant illustrated in FIG. 1A envisages four areas A1, A2, A3, and A4, and consequently four fixed human-machine-interface units HMI are provided. Typically, the fixed human-machine-interface unit HMI is provided in an area adjacent to the stations ST that the human-machine interface unit HMI is able to monitor and/or control. In the example illustrated, each fixed human-machine-interface unit HMI monitors and controls the subset of stations of the associated area A.

In particular, to control the stations ST, each fixed human-machine interface HMI is connected through a communication network COM to an electronic control and processing unit PLC, such as, for example, a programmable-logic controller (PLC). For instance, as illustrated in FIG. 1b, the interface HMI1 is connected to the unit PLC1 through a communication network COM1.

The electronic control and processing unit PLC is in turn connected to the stations ST of the associated area A, in particular (see FIG. 1C) to the actuators AT and to the sensors S of the associated stations ST. For instance, for this purpose, a communication network may be used, such as, for example, the network COM1 that is used for communication with the associated interface HMI. For instance, the aforesaid communication network may be an Ethernet, or a CAN (Controller-Area Network) bus, or in general any wired or wireless communication network.

Furthermore, the electronic control and processing unit PLC is connected to a smart terminal of a SCADA (Supervisory Control and Data Acquisition) type that provides for remote monitoring of the entire assembly line. For instance, for this purpose a communication network may be used, such as, for example, the LAN (Local-Area Network), for instance, an Ethernet, preferably wired.

Currently, then, the function of global monitoring lies in the SCADA smart terminal, whereas the local functions of diagnostics, control, and intervention, which are useful in the event of malfunctioning, are managed directly by the fixed human-machine interface HMI set in the vicinity of the assembly stations.

In general, one electronic control and processing unit PLC may also manage the stations of a plurality of areas A and hence interfaces HMI (see, for example, FIG. 2), or vice versa a plurality of electronic control and processing units PLC may be associated to a single area A.

Consequently, in general, the plant described previously, comprises a plurality of processing and/or assembly stations ST, for example, for carrying out operations on structures or components of motor vehicles. One or more electronic control and processing units PLC are associated to the assembly and/or processing stations ST, for control of at least one actuator AT and/or sensor S associated to the assembly and/or processing station ST. Finally, at least one human-machine-interface unit HMI is provided, configured for monitoring or controlling the assembly and/or processing stations ST through at least one electronic control and processing unit PLC.

Typically, the SCADA smart devices are implemented by means of one or more computers that are set outside the site in which the assembly plant is located, preferably in premises that are at a controlled temperature and relatively clean. Consequently, the aforesaid devices may even not be protected specifically from humidity, dust, temperature jumps, etc.

Instead, the fixed human-machine-interface units HMI are positioned in the proximity of the assembly stations and may be subject to critical working conditions as regards humidity, dust, and temperature jumps. Furthermore, in each plant a large number of fixed human-machine-interface units HMI are required, which contain a high level of built-in "intelligence" and entail high costs for their installation and maintenance.

With reference to FIG. 3, in a plant 1 of a known type the operator OP who wishes to intervene on a station ST must physically enter the area A in which the station ST is contained and, through the fixed human-machine-interface unit HMI associated to that A, can control the station ST.

Instead, the terminal SCADA is exclusively a monitoring terminal, from which the operator OP can observe the entire assembly line, but if an intervention is necessary, the operator OP must reach the fixed human-machine-interface unit HMI associated to the station ST to be controlled, and send directly, via the aforesaid fixed human-machine interface HMI, the command necessary for the station in question.

In particular, the fixed human-machine-interface units HMI are located near the stations ST to enable an operator OP to observe the effective status of the plant and see in real time the effects resulting from the modifications set via the command that he sends to the station. In this way, the operator OP is able to carry out, for example, an adjustment by varying the input parameters and noting the behaviour at output, thus carrying out a feedback control.

With the plants 1 of a known type the operator OP has only two possibilities for monitoring a given station ST, i.e., monitoring through the terminal SCADA or physically entering the associated control area A and querying the fixed human-machine-interface unit HMI on the status of the station ST.

SUMMARY

In the light of what has been set forth above, the object of the present invention is to provide a system for supervision and control of an industrial plant of the type referred to previously that will enable a convenient and versatile activity of monitoring and control of the plant, thus overcoming one or more of the drawbacks outlined above.

With a view to achieving the above purpose, the subject of the present invention is a system for monitoring and controlling an industrial plant.

In various embodiments, the human-machine interfaces described previously can be replaced by a portable computer, such as, for example, a mobile device, for example a computer of the tablet type, programmed for executing a plurality of functions, comprising global monitoring of the plant, local monitoring of each individual station, and local control of one of the stations.

In particular, the electronic control and processing unit associated to a given processing or assembly station authorizes and executes a control command generated by a portable human-machine-interface unit only if the electronic control and processing unit detects the presence of the portable human-machine-interface unit in the area close to the station.

The main advantage of the system for monitoring and controlling an industrial plant according to the invention lies in the fact that the human-machine-interface unit is portable and enables monitoring of the plant and of the various assembly stations to be carried out from any position inside or outside the plant.

Furthermore, through management of user profiles, each operator can select only the functions that are accessible to him or her and has available additional functions, such as, for example, display of tutorial images or videos, designed to instruct the operator on one or more manual operations to be performed in a given assembly station for solution of any malfunctioning. This renders the interventions of the operator faster, better targeted, and more incisive.

For instance, to detect the presence of the portable human-machine-interface unit in the vicinity of the station, the system may comprise a plurality of identification devices arranged in a substantially predefined position and/or close to the assembly stations. Each identification device is associated to a given control area, which comprises one or more assembly and/or processing stations for enabling detection of the position of a portable human-machine-interface unit in the area under control.

For instance, in this case, the identification device can detect identification of a portable human-machine-interface unit and can communicate with one or more electronic control and processing units associated to the same area to which the identification device is associated for confirming the presence of the portable human-machine-interface unit.

For instance, in a preferred embodiment, the portable human-machine-interface unit is provided for operating in wireless mode and for automatically pairing with one of the identification devices when the human-machine-interface unit is brought into the proximity of the identification device. Pairing between the portable interface unit and the identification device can also activate the functions of command and control of the assembly and/or processing stations associated to the identification device with which the tablet portable interface unit has carried out pairing.

Thanks to the aforesaid characteristics, the system for monitoring and controlling an industrial plant according to the invention has a high degree of operating flexibility, being adaptable for operating in different modalities and with the capacity to carry out a plurality of functions by means of a single device.

In particular, the system for monitoring and controlling an industrial plant according to the invention enables, via the portable unit, for example a tablet, execution of a plurality of functions, such as monitoring of the entire plant, diagnostics, and immediate intervention in the event of malfunctioning of a single assembly and/or processing station, and access to databases available for training having tutorial functions for the operator.

In particular, with the portable interface unit according to the present invention it is possible to carry out monitoring of the plant as a whole, this being a function that before was available only via the smart terminal of a SCADA type, which functioned as sole remote control station.

It is moreover possible to monitor individual assembly stations without the need to go directly to the individual station to be monitored; i.e., it is for example possible to monitor the first station even though the portable interface unit is located at the last station.

In addition, each operator can query through the portable interface unit the databases to obtain in real time the information on management and solution of malfunctioning of a particular station, without actually having to go to the SCADA smart terminal, as was the case in the past.

Further characteristics and advantages of the invention will emerge from the ensuing description.

BRIEF DESCRIPTION OF THE DRAWINGS

One or more embodiments will now be described, purely by way of non-limiting example, with reference to the annexed drawings, wherein:

FIGS. 1A, 1B, 1C, 2, and 3 are schematic drawings of examples of prior art industrial plants;

It will be appreciated that, for greater clarity of illustration, the parts visible in the figures are not to be considered necessarily represented in scale.

DETAILED DESCRIPTION

Illustrated in the ensuing description are various specific details aimed at providing an in-depth understanding of examples of one or more embodiments. The embodiments may be obtained without one or more of the specific details, or with other methods, components, materials, etc. In other cases, known structures, materials, or operations are not illustrated or described in detail so that various aspects of the embodiments will not be obscured. Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in various points of the present description, do not necessarily refer to one and the same embodiment. Furthermore, particular conformations, structures, or characteristics may be combined in any adequate way in one or more embodiments.

The references used herein are provided only for convenience and hence do not define the sphere of protection or the scope of the embodiments.

In the ensuing description parts that are the same as the ones already described previously with reference to the prior art will be designated by the same references.

Figure 4A:
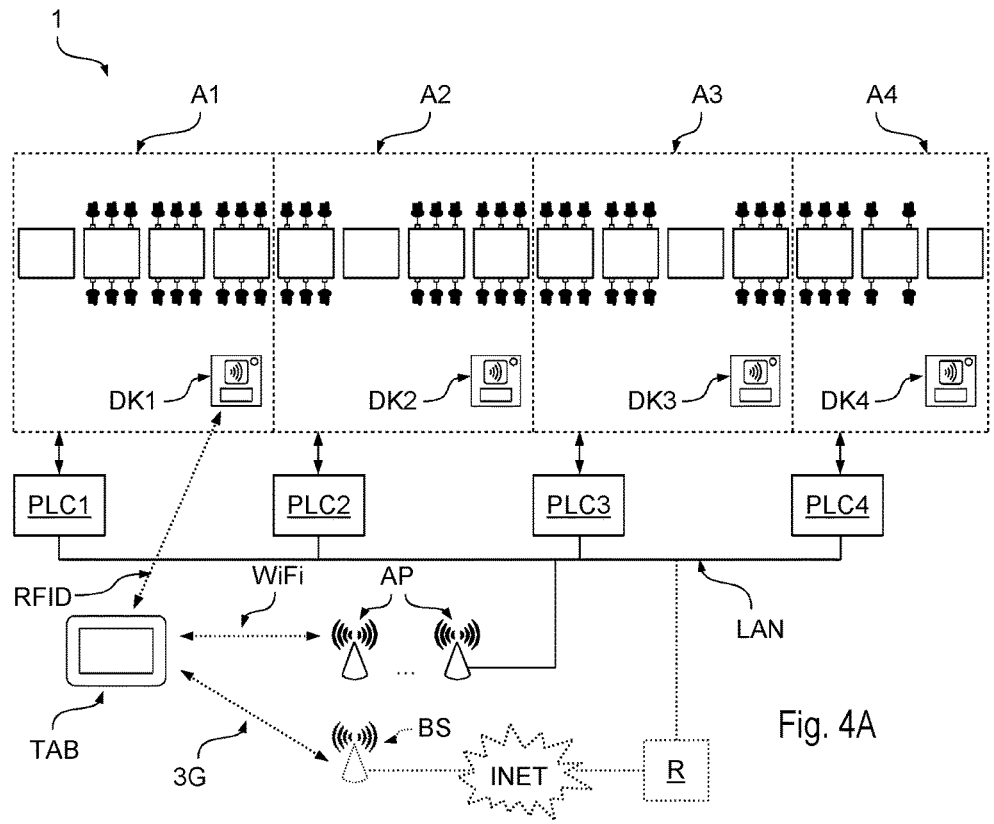
FIG. 4A is a schematic drawing of an example of a system of supervision and control of an industrial plant according to the present invention.

For instance, the reference number 1 designates as a whole a production and/or assembly plant or line comprising a plurality of fixed assembly and/or processing stations ST. For instance, as illustrated in FIG. 4A the plant 1 may comprise fifteen stations ST, and the last station ST yields the finished piece.

Also in this case, the plant is divided into control areas A, such as, for example, four areas A1, A2, A3, and A4, and each area A corresponds to a subset of assembly stations adjacent to one another.

In general, the plant further comprises a system for monitoring and control of the industrial plant 1 comprising at least one electronic control and processing unit PLC, such as, for example, a programmable-logic controller (PLC). In particular, as described previously, these PLC units communicate with the actuators AT and/or sensors S of the stations ST for controlling and/or monitoring operation of the stations ST (see FIGS. 4B and 1C).

In various embodiments, a respective electronic control and processing unit PLC is associated to the stations ST that belong to a given area A. For instance, as illustrated in FIG. 4A, four units PLC1, PLC2, PLC3, and PLC4 may be provided for the four areas A1, A2, A3 and A4, respectively.

Figure 5A:
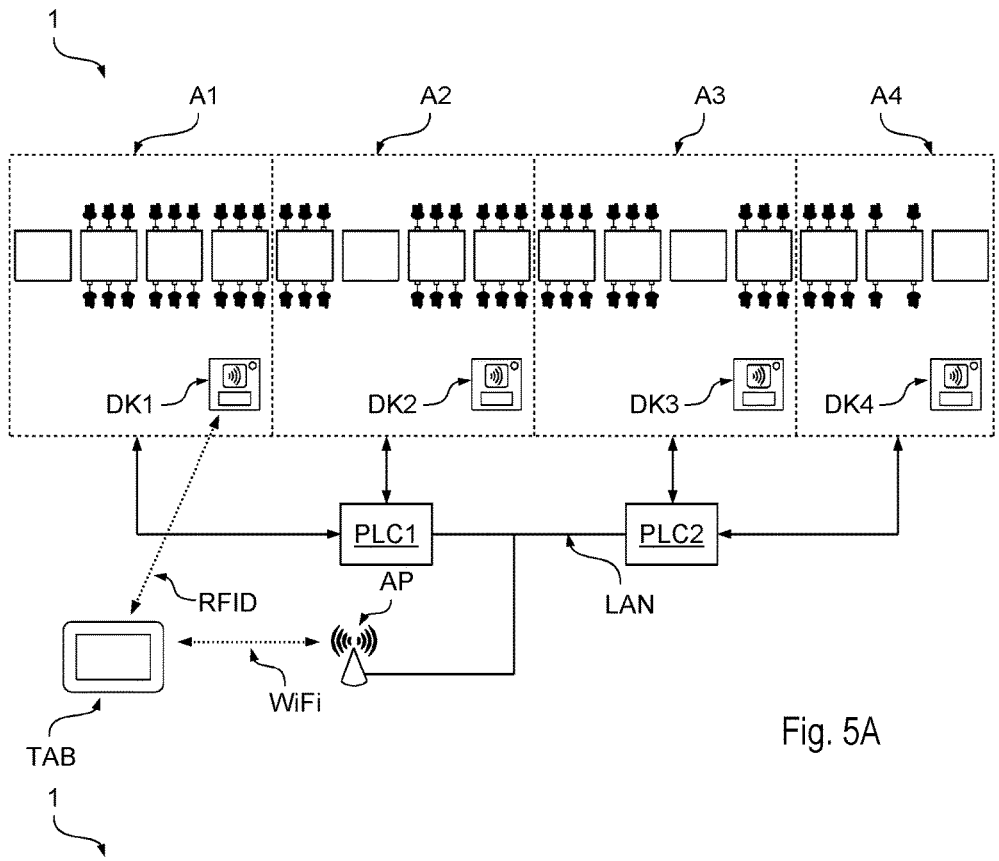
FIGS. 5A and 5B schematic drawings of alternate examples of a system of supervision and control of an industrial plant according to the present invention.
Figure 5B:
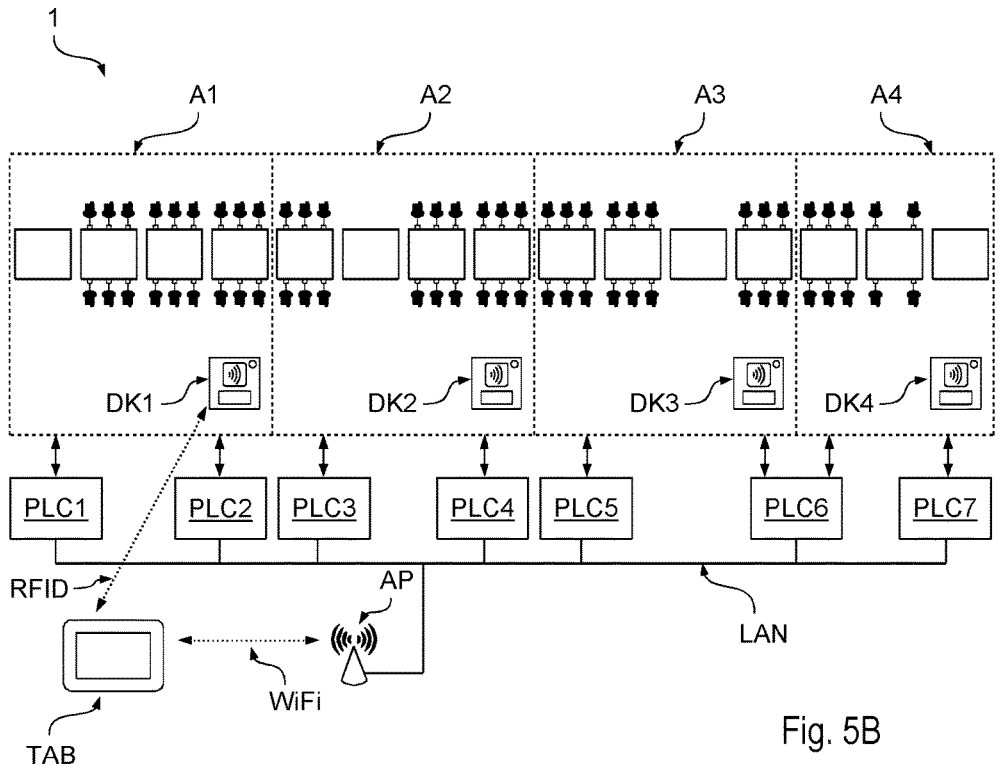

Instead, the number of the units PLC may also be lower or higher than the number of the areas A. For instance, in the embodiment illustrated in FIG. 5A only two units PLC1 and PLC2 are provided, which control the stations ST. Instead, in the embodiment illustrated in FIG. 5B seven units PLC1, . . . , PLC7 are provided, which control the stations ST. In particular, a given PLC unit can also control stations ST that are assigned to different areas A (see, for example, the unit PLC6 of FIG. 5B).

Consequently, in general, the system of supervision and control of the plant 1 comprises one or more electronic control and processing units PLC that are associated to the assembly and/or processing stations ST for controlling the actuators AT and/or sensors S associated to the stations ST.

The architecture of the system moreover envisages a human-machine-interface unit in the form of a portable computer, such as, for example, a mobile device or tablet, designated by the reference TAB. In general, by "portable computer" is meant a computer of a portable type comprising a processor, display means for displaying information, a user interface, and an electric-charge accumulator, such as, for example, a battery. For instance, in the case where the processor TAB is a tablet, the display means and the user interface are implemented with a touchscreen.

As illustrated in FIG. 4A, the portable computer TAB further comprises a wireless-communication interface that enables connection to the local network LAN that connects the electronic control and processing units PLC.

Figure 6:
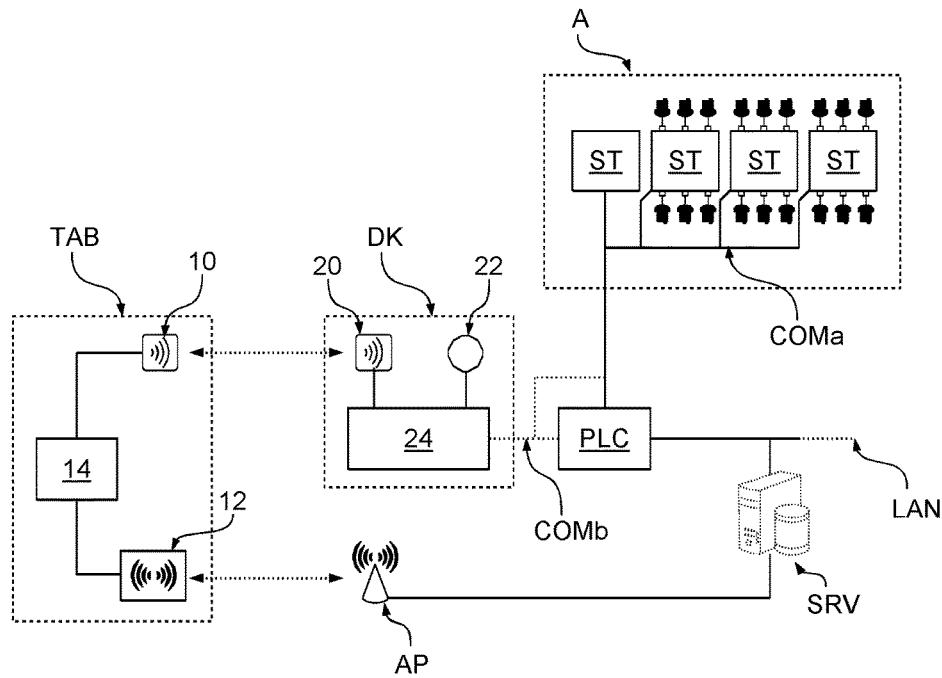
FIG. 6 is a block diagram that illustrates the architecture of the system and the connections between the elements that make it up.

For instance, as illustrated in FIGS. 4A and 6, the network LAN may comprise one or more access points AP, and the portable computer TAB may comprise a corresponding wireless transceiver 12. In this case, the communication between the portable computer TAB and an access point AP is obtained via a wireless communication, and the access point AP converts the communication into the protocol used by the network LAN. For instance the communication between the access point AP and the electronic control and processing unit PLC is preferably obtained via wired communication, for example an Ethernet that may comprise one or more switches.

For instance, communication between the portable computer TAB and the access point AP may be based upon the WiFi (Wireless Fidelity) protocol of the IEEE 802.11 standard. In particular, in the embodiment considered in FIG.

4A, the aforesaid wireless network covers the entire production line 1. For instance, this may be obtained via a plurality of access points AP that have the same SSID (Service Set IDentifier) and/or one or more radio-signal repeaters.

In general, the aforesaid communication network that covers the entire line 1 could be obtained also via a portable computer TAB that comprises a communication interface of a mobile-radio network, such as, for example, a GPRS (General Packet Radio Service) modem, a UMTS (Universal Mobile Telecommunications System) modem, an HSPA (High-Speed Packet Access) modem, or an LTE (Long Term Evolution) modem, in which the aforesaid interface connects up, via a mobile communication protocol, designated in FIG. 4A by the reference 3G, to a base station BS for enabling a communication with the Internet INET. In this case, the system for control and monitoring of the plant 1 may comprise a router R, such as, for example, an ADSL router or an optical-fibre router, which connects the network LAN to the Internet INET and enables an exchange of data with the portable computer TAB exploiting communications through the Internet INET.

Preferably, the portable computer TAB has installed on it an operating system, typically of the multi-tasking type, which enables execution of a number of applications simultaneously, such as, for example, Windows Mobile™, IOS™, or Android™.

Figure 2:
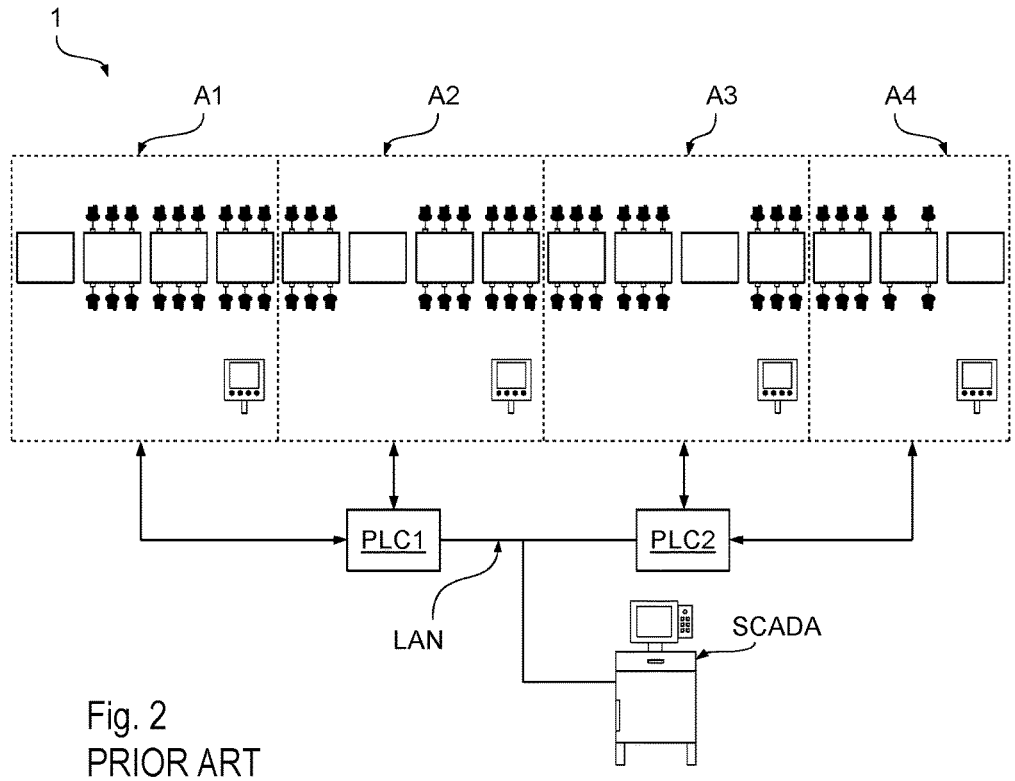
Figure 3:
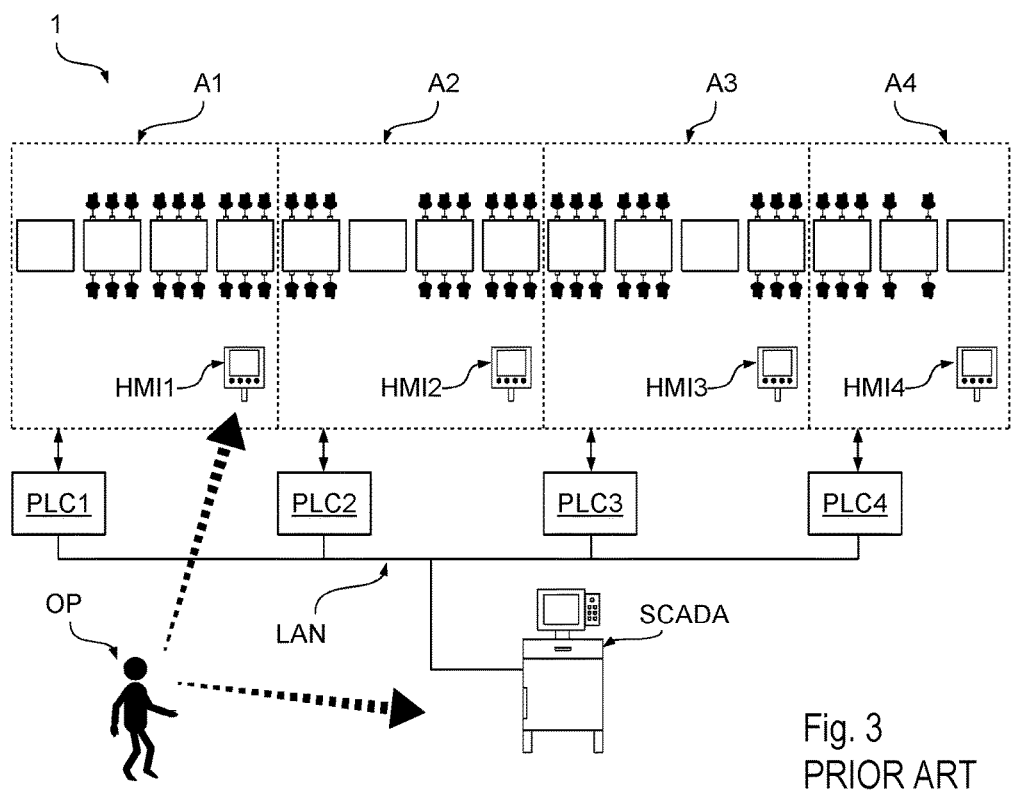

In an embodiment, the portable computer TAB envisages an application that implements the functions of global monitoring that before were obtained by the smart terminal SCADA illustrated in FIGS. 1A, 2, and 3.

In an embodiment, an application also implements the functions of local monitoring that were obtained by the fixed human-machine interfaces HMI shown in FIGS. 1a, 2, and 3.

Finally, in an embodiment, an application offers the functions of display of tutorial images or videos for immediate training of an operator OP. For instance, the latter function may have the purpose of instructing the operator OP on one or more manual operations to be performed in a given station ST for solving a given malfunctioning of the station ST.

In general, the above functions can be implemented through a single application or distinct applications that are installed on the portable device TAB.

Figure 10:
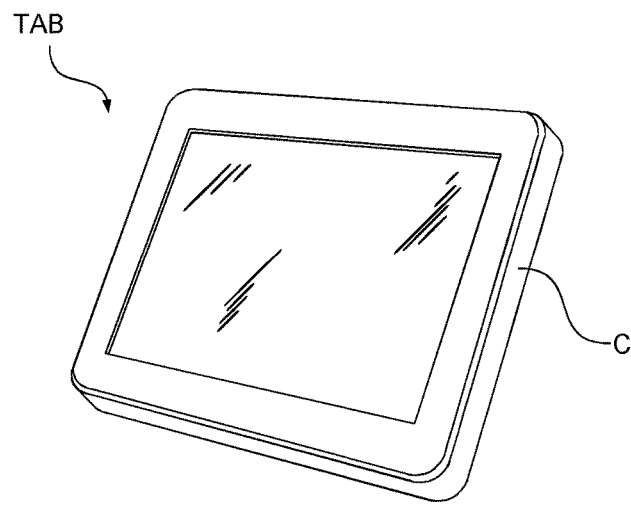
FIG. 10 is an example of tablet interface unit.

As mentioned previously, the portable interface unit TAB comprises display means and data-input peripherals (for example, a touchscreen, which may also show a keypad) and may envisage image-acquisition means, such as a digital photographic camera, or audio-acquisition means, such as a microphone for adding audio comments. An example of portable human-machine-interface unit TAB is illustrated in FIG. 10. In particular, in the example illustrated, the portable computer TAB is equipped with a protective case or cover C made of rubber or silicone for protecting the interface from any impact.

For instance, in various embodiments, the portable interface unit TAB is configured for displaying on a screen various icons each associated to a different application or operating mode selectable via the aforesaid data-input peripherals.

Figure 7:
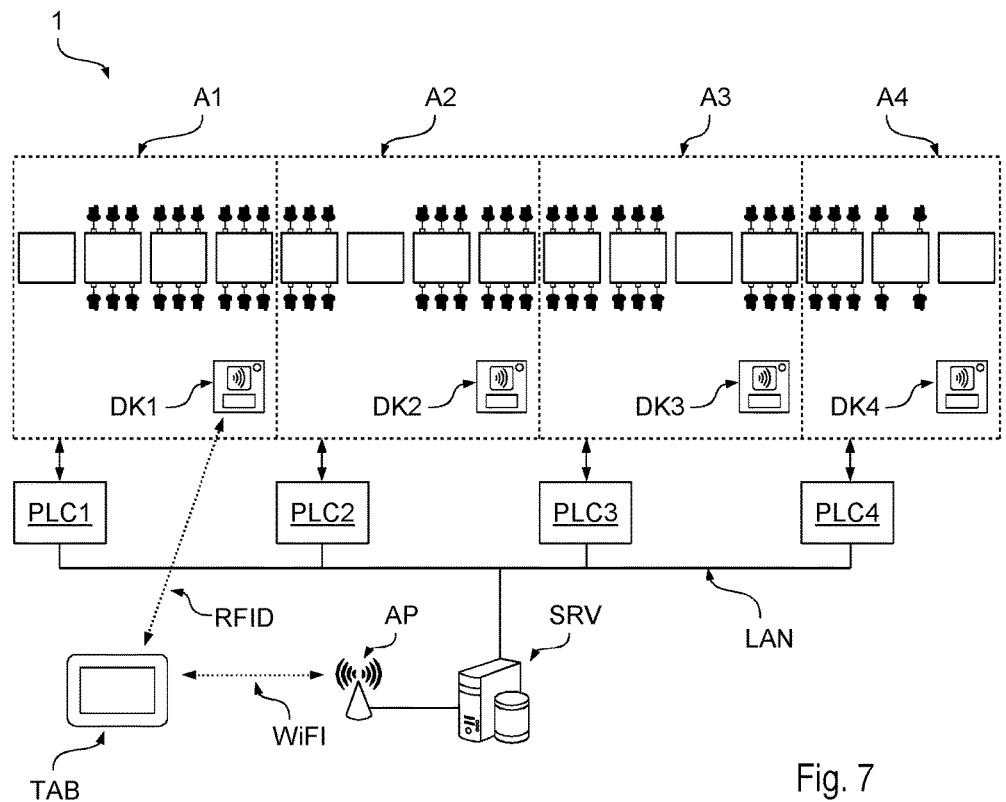
FIGS. 7, 8 and 9 are further block diagrams that illustrate the architecture of the system and the connections between some of the elements that make it up.

As illustrated in FIG. 7, the control and monitoring system may also comprise a central computer SRV of a server type for providing services and data to the portable computer TAB and/or the electronic control and processing units PLC. In general, the functions of the server SRV may be implemented via portions of software code that are executed via a computer or a processing system with distributed architecture (the so-called "cloud computing").

For instance, operation of the portable device TAB may be managed via the central server computer SRV. For this reason, the application installed on the portable computer TAB could even be just a display, and the commands addressed to the electronic control/processing unit PLC could be generated directly by the server SRV, i.e., the server SRV could be a so-called "terminal server", installed on which are all the control and monitoring applications, and the portable computer may have installed thereon a so-called "terminal client" that is connected to the aforesaid terminal server SRV.

For instance, use of such a terminal server SRV is advantageous if a number of portable terminals TAB are envisaged, because it is sufficient to update just the applications installed on the aforesaid server SRV.

In one embodiment, the portable computer TAB envisages an application that implements the functions of global monitoring that before were carried out by the smart terminal SCADA illustrated in FIGS. 1a, 2 and 3. In this case, the use of a terminal server SRV renders management of global monitoring (of a SCADA type) even more efficient, because a single computer SRV can carry out periodic monitoring of the status of the plant and receive possible notifications created by the electronic control and processing units PLC. For instance, these notifications may signal cases of malfunctioning.

Consequently, in general the control and monitoring function described herein can be obtained via appropriate applications installed on the portable device TAB and/or on the central server computer SRV.

Furthermore, in various embodiments, the portable human-machine-interface unit TAB and/or the server SRV is configured for managing different user profiles. In general, management of these user profiles can be implemented directly in the applications installed on the portable device TAB. However, the user profiles are preferably stored in the central server computer SRV.

For instance, the portable human-machine-interface unit TAB can recognize the user profile of the operator OP through a LOGIN operation. Next, through an operation of authentication with the central computer SRV, the portable interface TAB sets, on the basis of the user profile returned by the central computer SRV, a predefined configuration in terms of functions and level of accessibility associated to the user profile recognized. For instance, not all the operators OP can have access to the function of global control and/or monitoring. Furthermore, certain operators OP may have access only to the functions of control and monitoring of a given control area A.

Figure 11A:
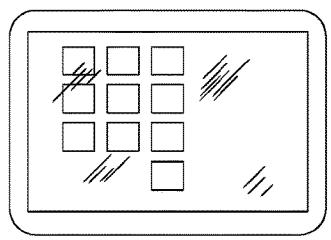
FIGS. 11A through E illustrate various screenfuls associated to the various functions available on the tablet interface unit.
Figure 11B:
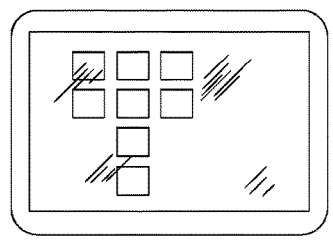
Figure 11C:
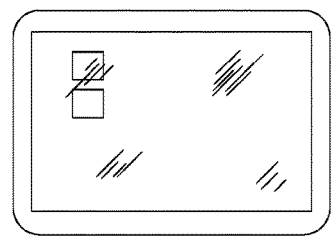
Figure 11D:
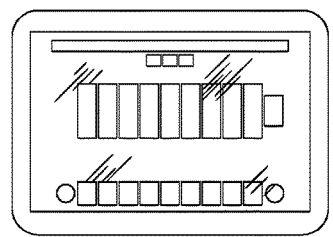
Figure 11E:
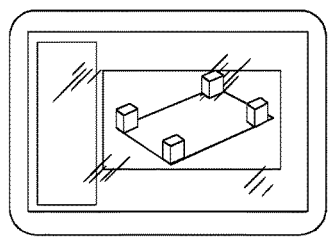

Illustrated in FIGS. 11A to 11E are some of the possible configurations that may be accessed via the portable interface TAB. For instance, in the embodiment considered, it is possible to select a general screenful for plant-level monitoring (FIG. 11A), a general screenful for plant production (FIG. 11B), a general screenful of the tutorials pages with selectable predefined icons (FIG. 11C), a screenful for global monitoring (of a SCADA type) or local monitoring (of a fixed HMI type)(FIG. 11D), and finally a screenful for managing documents or videos (FIG. 11E).

In various embodiments, the monitoring and control system is configured for carrying out local control of a processing and/or assembly station ST if and only if the human-machine-interface unit TAB is in the vicinity of the respective station ST, in particular when the human-machine-interface unit TAB is located in the control area A associated to that station ST.

In general, the system comprises for this purpose a positioning system that enables detection of the position of the portable device TAB within the areas A.

In particular, in various embodiments, the position of the portable computer TAB is detected via an operation of pairing with an identification element.

Figure 4B:
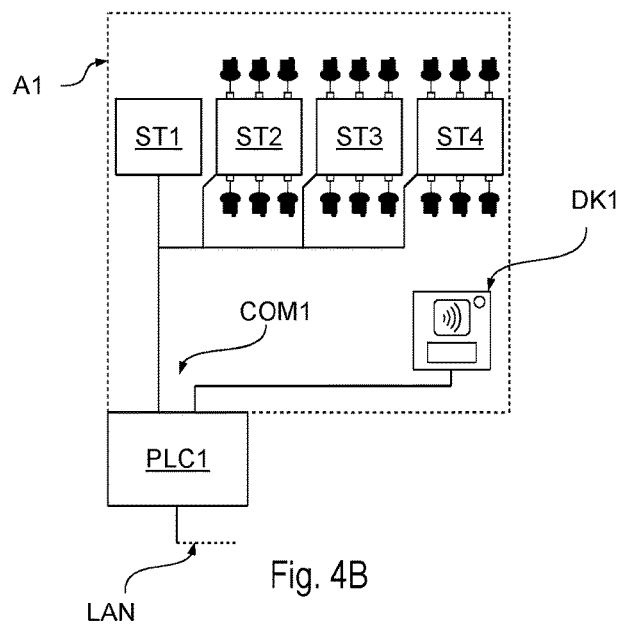
FIG. 4B is an enlarged view of a portion of FIG. 4A.

For instance, in the embodiment illustrated in FIGS. 4A and 4B, associated to each one of the areas A into which the entire plant 1 is divided, is an identification element DK. For instance, for a plant with four control areas A1, A2, A3, A4 four presence sensors DK1, DK2, DK3, DK4 are hence provided.

In particular, each identification element DK is set in a substantially predefined position and/or a position close to the respective subset of stations ST and enables detection of the presence of the portable human-machine-interface unit TAB in an area A. For instance, typically the aforesaid identification elements DK are provided in the position where the fixed human-machine interface HMI was normally provided.

In general, the pairing operation between the processor TAB and an identification element DK may be carried out via a unidirectional or bidirectional communication, and the communication may be wired or wireless.

Consequently, for the human-machine-interface unit TAB to be enabled for control of a station ST comprised in a given area A, it must first execute a pairing operation with one of the identification elements DK.

After the portable human-machine-interface unit TAB has carried out pairing with the corresponding identification element DK, the electronic control and processing unit PLC associated to the assembly station ST (and/or the server SRV) can authorize and execute the control commands generated by the portable human-machine-interface unit TAB.

FIG. 6 illustrates a first embodiment of the monitoring and control system.

As explained previously, the portable human-machine-interface unit TAB is pre-arranged for being connected in wireless mode to the network LAN that connects the electronic control and processing units PLC. For instance, as explained previously, the portable computer TAB can connect up to the network LAN and/or to the server (which can operate as gateway or application server) through a transceiver 12 that communicates with at least one access point AP. However, in general, it is sufficient for the processor TAB to be able to send directly or indirectly (for example, via the server SRV) monitoring and/or control instructions to the electronic control and processing units PLC for requesting monitoring and/or control of a given station ST associated to the respective electronic control and processing unit PLC.

For instance, in various embodiments, the positioning system that enables the position of the portable computer TAB to be established is obtained via a wireless-communication system.

For example, in the embodiment considered, the human-machine-interface unit TAB comprises a transceiver 10, and the identification element DK comprises a transceiver 20.

As illustrated in FIG. 6, for carrying out the pairing operation, the aforesaid transceivers 10 and 20 can be connected to respective control units 14 and 24, such as microprocessors, provided in the portable computer TAB and in the identification element DK, respectively.

In various embodiments, in particular in the case where the fixed human-machine interfaces (for example, the interfaces HMI in FIG. 1) are no longer envisaged, the device DK may moreover be equipped with an emergency push-button 22 for blocking the respective area A in the case of danger for an operator. Furthermore, the aforesaid emergency push-button 22 can also be provided on the portable interface TAB.

In various embodiments, the portable computer TAB and the identification element DK are thus configured for operating in wireless mode and for automatically carrying out pairing when the portable interface unit TAB is brought into the proximity of one of the devices DK.

For instance, in one embodiment, pairing is obtained by means of a short-range communication protocol, for example through an NFC (Near-Field Communication), which is a technology that provides bidirectional wireless (RF) connectivity between two devices.

In general, a unidirectional communication between the identification element DK and the portable computer TAB may also be used.

For instance, one of the devices 10 or 20 may be obtained via an RFID (Radio Frequency IDentification) tag, on which some data are stored, and the other device, 20 or 10 respectively, may be an RFID reader. In this case, when the portable interface unit TAB is brought into the range of action of the device DK, the RFID tag responds to the remote query from the RFID reader.

Furthermore, instead of the above wireless-communication system, other types of tags can also be used. For instance, one of the devices 10 or 20 can be replaced with a tag with a barcode identifier or a code of a two-dimensional type, for example a QR code, and the other device, 20 or 10 respectively, may be a video camera or a barcode reader.

Finally, in one embodiment, the human-machine-interface unit TAB may be set physically in contact with a terminal provided in the device DK designed to receive and support the human-machine-interface unit TAB to carry out pairing of the two devices. Consequently, in general, communication between the human-machine-interface unit TAB and the identification device DK1 may be wired.

Consequently, irrespective of whether the communication between the element 10 and the element 20 is unidirectional or bidirectional, one of the elements 10 or 20 stores a code and the other of the elements 10 and 20 is a reader that reads the code. Consequently, the aforesaid code may be a code that uniquely identifies a portable device TAB or an identification element DK.

In various embodiments, the device DK is moreover connected to at least one electronic control and processing unit PLC and/or the server SRV. For instance, the device DK may be connected to an electronic control and processing unit PLC via the communication network COM that is used for communication between the electronic control and processing units PLC and the associated stations ST (designated by COMa in FIG. 6), or else an additional communication network (designated by COMb in FIG. 6) may be used, which connects the device DK directly to at least one electronic control and processing unit PLC. Furthermore, the devices DK may also be connected to the network LAN.

For instance, in a first embodiment, the identification device DK periodically monitors the presence of portable computers TAB in its vicinity and, when the presence of a portable device TAB is detected, the device DK reads the code that is associated to the portable device TAB and that uniquely identifies a given portable device TAB, referred to hereinafter as TAB_ID.

Next, the identification device DK sends the aforesaid code TAB_ID with its own identifier, referred to hereinafter as DK_ID, to the respective electronic control and processing unit PLC and/or to the server SRV, signalling in this way the position of the portable device TAB, i.e., the control area A where the portable device TAB is located. In fact, the identifier DK_ID identifies not only a given device DK but also a given control area A.

In this case, when the respective portable device TAB requests control of a given station ST associated to a given area A, the electronic control and processing unit PLC associated to that station ST and/or the server SRV can enable or inhibit control of the station ST according to the position detected. In this way, the portable device TAB can control only stations ST that are associated to one and the same area A.

For instance, typically a control command is an instruction that comprises a field that identifies the interface unit TAB that sends the control request, a field that identifies the station ST to which the command is addressed, i.e., a code that identifies a given actuator AT of a station ST, and a field that contains the instruction proper. In this case, the server SRV may not send the control command to the electronic control and processing unit PLC associated to the station ST if the portable device TAB is not located in the same area A, and/or the electronic control and processing unit PLC associated to the station ST may not execute the command if an instruction is received from a portable computer TAB that is not located in the same area.

Instead, as mentioned previously, in various embodiments, the local and global monitoring function can work in all cases.

Instead, in the case where the portable computer TAB is configured for detecting the devices DK in its vicinity, the portable computer TAB reads the code DK_ID associated to the device DK, which in turn identifies a given area. In particular, preferably a short-range communication (i.e., of just a few meters) is used for pairing the portable device TAB with the identification device DK, and consequently the portable device TAB can detect only one device DK at a time.

In this case, the portable computer TAB can include in a control command, not only the identifier of the station ST to be controlled, but also the identifier DK_ID of the identification device to which the portable computer TAB is paired.

Consequently, also in this case the electronic control and processing unit PLC associated to the aforesaid station ST and/or the server SRV can enable or inhibit control of the station ST according to the position detected, and the portable device TAB can control only stations ST that are associated to the same area A. For instance, the server SRV may not send a control command to the electronic control and processing unit PLC associated to the station ST (or the electronic control and processing unit PLC associated to the station ST may not execute the command) if the station ST to be controlled is not located in the associated area A identified via the code DK_ID.

In general, the pairing operation could also directly affect functioning of the applications installed on the portable device TAB or managed via the server SRV; for example, it could activate, on the portable interface unit TAB, the functions of command and control only for the stations ST that are associated to the control area A to which the portable interface unit TAB is connected up.

Consequently, in the control and monitoring systems described, the interface unit TAB is programmed for carrying out a plurality of functions, such as:
  a "high-profile" interface function, in co-operation with the electronic control and processing units PLC for global monitoring of the plant;
  a "low-profile" interface function, in co-operation with an electronic control and processing unit PLC for monitoring and control of the processing and/or assembly stations ST associated to a given control area A; and
  a function for display of tutorial images or videos for an operator, designed to instruct the operator on one or more manual operations to be performed in a given assembly station for solving a case of malfunctioning.

In the embodiments described previously two distinct communication channels are provided: a first communication channel (for example, the RFID communication channel in FIG. 5A) for detection of the position of the portable computer TAB; and a second communication channel (for example, the WiFi communication channel in FIG. 5A) for sending monitoring and control commands. In fact, in this case, the portable interface unit TAB connects up, for example via an access point AP and possibly the server SRV, to the second network LAN for communicating with the electronic control and processing units PLC. Instead, the first network RFID is used for pairing with an identification device DK, which has the purpose of detecting the position of the portable computer TAB within one of the control areas A. In this case, the exchange of commands for control and monitoring of the stations ST between the portable interface TAB and the electronic control/processing unit PLC is obtained only through the network LAN.

In general, these two communications may even be made over one and the same communication channel.

Figure 8:
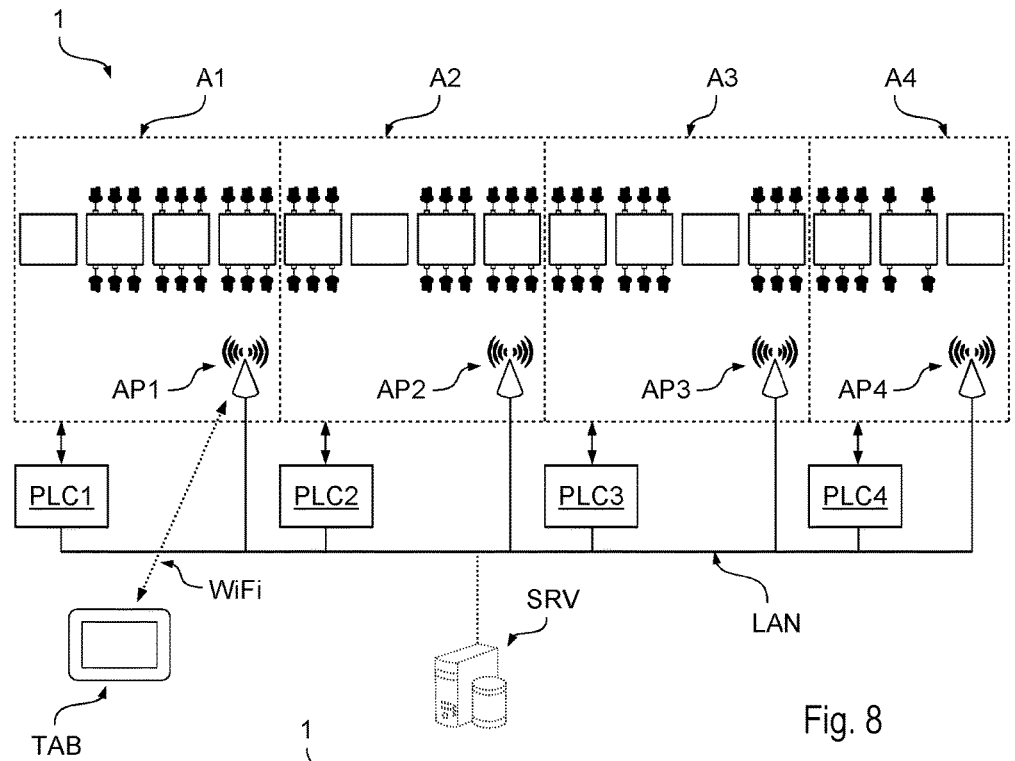

For instance, as illustrated in FIG. 8, the identification device DK may be replaced with a transceiver, such as for example an access point AP, such as a WiFi access point. Consequently, in this case, a transceiver AP is associated to each area A into which the entire plant 1 is divided. For instance, for a plant with four control areas A1, A2, A3 and A4 four transceivers or access points AP1, AP2, AP3, AP4 are thus envisaged. In this case, communication between the portable computer TAB and an access point AP is made via a wireless communication, and the access point AP converts the communication into the protocol used for the network LAN.

Consequently, as compared to the embodiments described previously, the access points AP are now in a substantially fixed position, and a respective access point AP is assigned to each control area A.

Furthermore, in the embodiment considered, connection to a given access point AP replaces pairing with the identification device DK, i.e., the access point AP now also represents the identification device DK that serves for detection of the position of the portable computer TAB.

For instance, the portable computer TAB may include in the request for control a field with a code that identifies the access point to which the portable computer TAB is connected, such as, for example, the MAC address and/or the SSID of the access point AP. In this case, the server SRV may not send a control command, and/or the electronic control and processing unit PLC may not execute the command if the controlled station ST is not located in the area A assigned to the respective access point AP.

In one embodiment, the server SRV or the electronic control and processing unit PLC can also detect the identifier of the access point AP to which a given portable computer TAB is associated. For instance, in one embodiment, the access point AP is configured as router with NAT (network address translation), and consequently the access point AP replaces the IP address of the processor TAB with its own IP address. Consequently, the server SRV could send, or else the electronic control and processing unit PLC could execute, control commands only if these commands come from a given IP address. In a similar way, another element identifying the access point could also be used, such as, for example, its MAC address.

Furthermore, in various embodiments, each access point AP could assign to the portable computers TAB an IP address taken from a certain range of non-overlapping IP addresses. In this way, also the IP address of the portable computer TAB can directly identify the area A in which the portable computer TAB is located.

Figure 9:
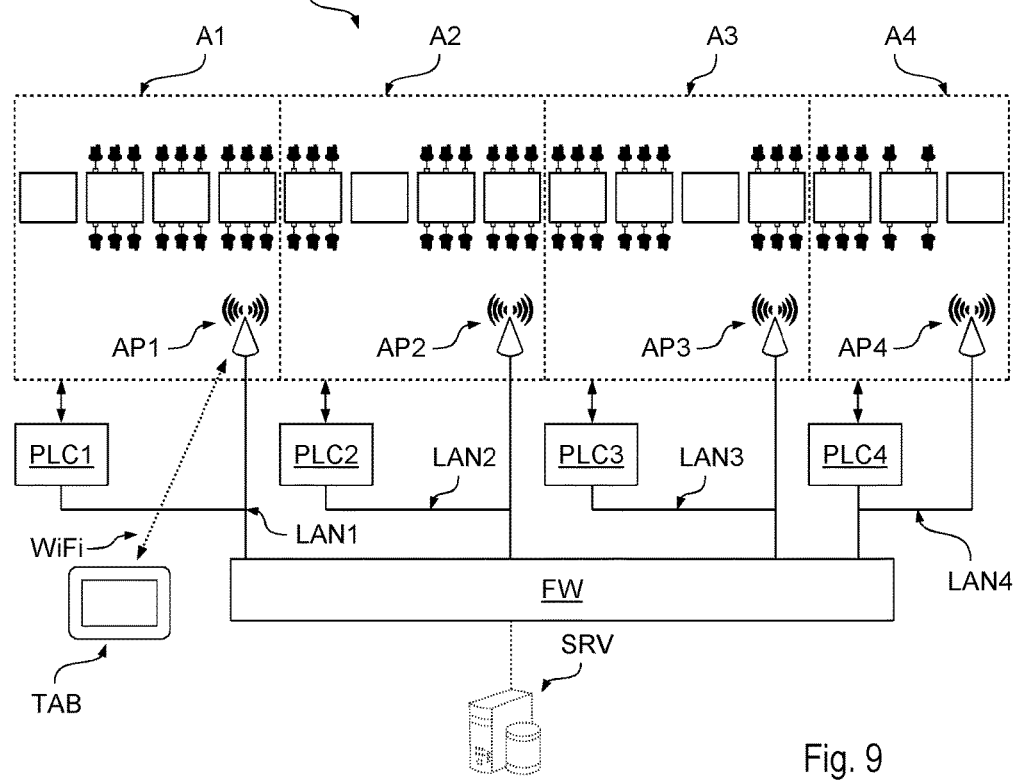

Finally, FIG. 9 shows an embodiment of a mechanism for blocking the commands that uses a firewall FW. The aforesaid firewall may be an additional hardware element or be implemented via software code, for example, in the server SRV.

In the embodiment considered, the network LAN is divided into sub-networks, where one sub-network is provided for each control area A.

Furthermore, provided for each sub-network are at least one electronic control and processing unit PLC that controls the stations ST assigned to the respective area A and one access point AP. For instance, four areas A1, A2, A3, and A4 are illustrated in the embodiment, and consequently four sub-networks LAN1, LAN2, LAN3, and LAN4 and four access points AP1, AP2, AP3, and AP4 are provided.

In various embodiments, each sub-network has a different range of IP addresses, for example 192.168.1.X for the network LAN1, 192.168.2.X for the network LAN2, 192.168.3.X for the network LAN3, and 192.168.4.X for the network LAN4.

Consequently, a portable computer TAB that connects up to a given access point has access only to the respective sub-network assigned to the respective access point, for example the network LAN1 for the access point AP1. Consequently, in one embodiment, the portable computer TAB can send and execute freely monitoring and control instructions in the respective sub-network.

In general, each electronic control and processing unit PLC and/or the server SRV could hence be configured for enabling control only of stations that are located in the control area A associated to the sub-network, located in which is the portable computer TAB, and inhibiting execution of control commands that come from portable computers TAB that are located in other sub-networks.

Instead, in the embodiment considered, the control commands are blocked via a firewall FW that connects the sub-networks LAN1, LAN2, LAN3, and LAN4 together. In particular, this firewall FW is configured for letting through monitoring commands, but blocking sending of control commands between the sub-networks. For instance, this can be obtained via filtering at a protocol level, or by assigning to the control communications a port different from that for the monitoring communications and blocking the port assigned to the control communications.

Consequently, in this embodiment, the portable computer TAB can select the access point AP and hence the network that should be controlled.

This embodiment presents the disadvantage that a WiFi wireless network may have a wide coverage (some tens of meters), whereas for the communication between the identification element and the portable computer TAB a short-range communication (for example between 1 and 5 m) may be used. Consequently, the portable computer TAB could also connect up to remote access points.

In one embodiment, to overcome the above problem, the transmission power of the access points could be reduced, thus limiting coverage of the access point. In addition, in one embodiment, the portable computer TAB could be configured for connecting up automatically to the access point with the highest transmission power, which should hence correspond to the nearest access point.

The general architecture of the system according to the invention is altogether flexible, and enables optimization of global and local monitoring via the use of a portable terminal TAB with additional functions.

Furthermore, the possibility of exploiting contents such as tutorial videos directly on the spot enables the operator OP to learn the operations to be performed, to execute them in real time, and to control directly the reaction of the stations ST, thus speeding up and optimizing interventions following upon any malfunctioning.

Of course, without prejudice to the principle of the invention, the details of construction and the embodiments may vary widely with respect to what has been described and illustrated herein purely by way of example, without thereby departing from the scope of the present invention.

The invention claimed is:

1. A system for monitoring and controlling an industrial plant (1) having a plurality of assembly and/or processing stations (ST) divided into a plurality of control areas (A), said system comprising:
   a plurality of electronic control and processing units (PLC), wherein associated to each control area (A) is at least one electronic control and processing unit (PLC) for selective monitoring or control of at least one of the plurality of stations (ST) that belong to the respective control area (A);
   a communication network (LAN) that connects said electronic control and processing units (PLC) together;
   at least one human-machine-interface unit configured for selectively monitoring or controlling said stations (ST), said at least one human-machine-interface unit comprises a portable computer (TAB) having a wireless transceiver (12), wherein said portable computer (TAB) is programmed for selectively executing a plurality of functions, including global monitoring of the industrial plant (1), local monitoring of at least one of said stations (ST), or local control of at least one of said stations (ST), wherein each portable computer (TAB) comprises a code that uniquely identifies the respective portable computer (TAB);
   means (AP, R, SRV) configured for enabling access of said portable computer (TAB) to said communication network (LAN) through said wireless transceiver (12) in such a way that said portable computer (TAB) can selectively send at least one of monitoring or control commands to said electronic control and processing units (PLC);
   a plurality of identification devices (DK; AP), wherein associated to each control area is a respective identification device (DK; AP) for detecting the presence of said portable computer (TAB) in the respective control area (A), wherein, for detecting the control area (A) in which said portable computer (TAB) is located, each said identification device (DK; AP) comprises a reader (20) configured for detecting the presence of said portable computer (TAB) and reading the code that uniquely identifies the respective portable computer (TAB), and wherein each identification device (DK; AP) has stored (20) within it a code that uniquely identifies the respective identification device (DK; AP) and consequently the control area (A) associated to the respective identification device (DK; AP), wherein each identification device (DK; AP) is connected to said respective at least one programmable-logic controller (PLC) and configured to send said code that uniquely identifies the respective identification device (DK; AP) to the respective at least one programmable-logic controller (PLC) signaling in this way the control area (CA) where said portable computer (TAB) is located;

said system is configured for executing the control command generated by said portable computer (TAB) and directed to the respective one of the plurality of stations (ST) only if said portable computer (TAB) and said respective station (ST) are located in the same control area (A), wherein the control command is an instruction that comprises a field that identifies the portable computer (TAB) that has sent the control request, a field that identifies the processing stations (ST) to which the command is addressed and a field that contains the instruction; and said plurality of programmable-logic controllers (PLC) are configured for executing the control command generated via said portable computer (TAB) and addressed to a given processing station (ST) only if said portable computer (TAB) and said given processing station (ST) are located in the same control area (A).

2. The system according to claim 1 wherein said portable computer (TAB) further comprises a reader (10) configured for detecting the presence of an identification device (DK; AP) and reading the code that uniquely identifies the respective identification device (DK; AP) for detecting the control area (A) in which the portable computer (TAB) is located, and wherein said portable computer (TAB) is configured for including said code that uniquely identifies the respective identification device (DK; AP) in each control command.

3. The system according to claim 2 wherein the portable computer (TAB) comprises a plurality of individual portable computers (TAB).

4. The system according to claim 3, wherein each portable computer (TAB) comprises a code that uniquely identifies the respective portable computer (TAB).

5. The system according to claim 4, wherein said identification device (DK; AP) further comprises a reader (20) configured for detecting the presence of a respective one of the portable computers (TAB) and reading the respective portable computer code, wherein said system is configured for executing the control command generated by said portable computer (TAB) and directed to the respective one of the plurality of stations (ST) only if said identification device (DK; AP) has detected the presence of said portable computer (TAB) in the control area (A) in which said respective station (ST) is located.

6. The system according to claim 1 wherein said identification device (DK; AP) and said portable computer (TAB) communicate by one of a short-range wireless communication or a wired communication.

7. The system according to claim 6, wherein:
said portable computer (TAB) or each identification device (DK; AP) comprises a radiofrequency identifier tag (RFID); or
said portable computer (TAB) is physically set in contact with a terminal positioned on a respective one of said identification devices (DK; AP).

8. The system according to claim 1, wherein said means (AP, R, SRV) configured for enabling access of said portable computer (TAB) to said communication network (LAN) comprise at least one of an access point (AP) or a router (R) connected to the Internet (INET).

9. The system according to claim 8, wherein a respective access point (AP) is associated to one of the plurality of control areas (A) in such a way that said portable computer (TAB) can selectively send the at least one of the monitoring or the control commands to said at least one electronic control and processing unit (PLC) associated to said associated one control area (A).

10. The system according to claim 9, wherein said access point (AP) represents said identification devices (DK; AP) for detecting the presence of said portable computer (TAB) in the respective control area (A).

11. The system according to claim 1 wherein the means configured for enabling access of said portable computer (TAB) to said communication network (LAN) comprises a central computer (SRV) of a server type, wherein said portable computer (TAB) is configured for communicate with said central computer (SRV) for selectively sending said monitoring or control commands to said electronic control and processing units (PLC).

12. The system according to claim 11, wherein said central computer (SRV) is configured for sending the control command generated by the portable computer (TAB) and directed to the respective station (ST) only if said portable computer (TAB) and said respective station (ST) are located in the same control area (A).

13. The system according to claim 1, wherein said communication network (LAN) that connects said plurality of electronic control and processing units (PLC) together comprises means (FW) configured for transmitting the control command generated by the portable computer (TAB) and addressed to the respective station (ST) only if said portable computer (TAB) and said given station (ST) are located in the same control area (A).

14. The system according to claim 1, wherein said portable computer (TAB) is configured for managing various user profiles.

15. A system for selective monitoring and controlling a plurality of assembly line processing stations organized in a plurality of control areas in an industrial plant, the system comprising:
an electronic control and processing unit in communication with the plurality of assembly line processing stations, each processing station positioned in one of the plurality of control areas;
one of an identification device or an access point positioned in each of the plurality of control areas and in communication with the electronic control and processing unit each of the one of an identification device or an access point has stored within it a code that uniquely identifies the respective one of an identification device or an access point; and
a portable computer in selective communication with the electronic control and processing unit and the one of the identification device or access point in each of the plurality of control areas, wherein each portable computer includes a code that uniquely identifies the respective portable computer;
the one of an identification device or an access point includes a reader operable to detect the presence of the portable computer and read the code that uniquely identifies the respective portable computer;

the one of an identification device or an access point operable to send the code that uniquely identifies the one of an identification device or an access point to the electronic control and processing unit signalling in this way a control area where the portable computer is located;

the portable computer operable to selectively send signals to the electronic control and processing unit to selectively monitor or control the respective processing stations in the respective control areas;

the portable computer is operable to send a control signal to the electronic control and processing unit to control of one of the plurality of assembly line process stations positioned in the respective control area, wherein the control signal is an instruction that includes a field that identifies the portable computer that has sent a control request, a field that identifies the stations to which the control signal is addressed and a field that contains the instruction; and the electronic control and processing unit operable to execute the control signal directed to the respective processing station only on recognition by the respective identification device or access point that the portable computer is positioned in a predetermined proximity location to the respective control area for the respective processing station to be controlled.

16. A system for monitoring and controlling an industrial plant (1) having a plurality of assembly and/or processing stations (ST) divided into a plurality of control areas (A), said system comprising:

a plurality of electronic control and processing units (PLC), wherein associated to each control area (A) is at least one electronic control and processing unit (PLC) for selective monitoring or control of at least one of the plurality of stations (ST) that belong to the respective control area (A);

a communication network (LAN) that connects said electronic control and processing units (PLC) together;

at least one human-machine-interface unit configured for selectively monitoring or controlling said stations (ST), said at least one human-machine-interface unit comprises a portable computer (TAB) having a wireless transceiver (12), wherein said portable computer (TAB) is programmed for selectively executing a plurality of functions, including global monitoring of the industrial plant (1), local monitoring of at least one of said stations (ST), or local control of at least one of said stations (ST);

means (AP, R, SRV) configured for enabling access of said portable computer (TAB) to said communication network (LAN) through said wireless transceiver (12) in such a way that said portable computer (TAB) can selectively send at least one of monitoring or control commands to said electronic control and processing units (PLC);

the means configured for enabling access of said portable computer (TAB) to said communication network (LAN) comprises a central computer (SRV) of a server type, wherein said portable computer (TAB) is configured to communicate with said central computer (SRV) for selectively sending said monitoring or control commands to said electronic control and processing units (PLC);

said central computer (SRV) configured for sending the control command generated by the portable computer (TAB) and directed to the respective station (ST) only if said portable computer (TAB) and said respective station (ST) are located in the same control area (A);

a plurality of identification devices (DK; AP), wherein associated to each control area is a respective identification device (DK; AP) for detecting the presence of said portable computer (TAB) in the respective control area (A); and said system is configured for executing the control command generated by said portable computer (TAB) and directed to the respective one of the plurality of stations (ST) only if said portable computer (TAB) and said respective station (ST) are located in the same control area (A).

* * * * *